(12) United States Patent
Chhabra et al.

(10) Patent No.: US 11,418,856 B2
(45) Date of Patent: Aug. 16, 2022

(54) SYSTEMS AND METHODS FOR VIDEO CONTENT SECURITY

(71) Applicant: Synamedia Limited, Staines upon Thames (GB)

(72) Inventors: Amit Chhabra, Bangalore (IN); Sandipan Bhattacharjee, Bangalore (IN); Sonu Mariam George, Kottayam (IN)

(73) Assignee: SYNAMEDIA LIMITED, Staines upon Thames (GB)

( * ) Notice: Subject to any disclaimer, the term of this patent is extended or adjusted under 35 U.S.C. 154(b) by 265 days.

(21) Appl. No.: 16/932,388

(22) Filed: Jul. 17, 2020

(65) Prior Publication Data

US 2021/0337282 A1 Oct. 28, 2021

Related U.S. Application Data

(60) Provisional application No. 63/016,093, filed on Apr. 27, 2020.

(51) Int. Cl.
| | |
|---|---|
| *H04N 21/442* | (2011.01) |
| *H04N 21/8358* | (2011.01) |
| *G06N 20/00* | (2019.01) |
| *H04N 21/4402* | (2011.01) |

(Continued)

(52) U.S. Cl.
CPC ......... *H04N 21/8358* (2013.01); *G06N 20/00* (2019.01); *H04N 21/2541* (2013.01); *H04N 21/440272* (2013.01); *H04N 21/47217* (2013.01)

(58) Field of Classification Search
None
See application file for complete search history.

(56) References Cited

U.S. PATENT DOCUMENTS

| 9,654,814 B2 * | 5/2017 | Tulsi | H04N 21/44008 |
| 10,003,858 B2 * | 6/2018 | Austin | H04N 21/4722 |

(Continued)

OTHER PUBLICATIONS

Fenlon, Wesley, "How Digital Fingerprinting Works," https://computer.howstuffworks.com/digital-fingerprinting.htm/printable (last visited Apr. 24, 2020).

(Continued)

*Primary Examiner* — Cai Y Chen
(74) *Attorney, Agent, or Firm* — Finnegan, Henderson, Farabow, Garrett & Dunner, LLP

(57) ABSTRACT

The present disclosure provides systems and methods for video content security and for detecting and preventing unauthorized playback. According to an exemplary method, a device performing a video playback can acquire a set of video frames from a decoder during the video playback, and generate, based on the set of video frames, a first video identifier. The first video identifier can be sent to a server. In response to the server determining that the first video identifier matches a second video identifier stored in the server, the device can receive a list of authorized playback sources associated with the second video identifier. The device can determine whether a source of the video playback is included in the list of authorized playback sources, and control the video playback based on the determination.

22 Claims, 10 Drawing Sheets

(51) Int. Cl.
*H04N 21/472* (2011.01)
*H04N 21/254* (2011.01)

(56) References Cited

U.S. PATENT DOCUMENTS

2004/0028281 A1* 2/2004 Cheng .................. H04N 5/913
382/248
2017/0094330 A1* 3/2017 Maughan ......... H04N 21/23418

OTHER PUBLICATIONS

Lu, Jian, "Video fingerprinting for copy identification: from research to industry applications," Proceedings of SPIE—Media Forensics and Security XI, vol. 7254, Jan. 2009.
Pizzatto, Ricardo, "Understanding Digital Piracy in OTT and IPTV Channels," MarkMonitor Webinar.

* cited by examiner

SYSTEMS AND METHODS FOR VIDEO CONTENT SECURITY

CROSS-REFERENCE TO RELATED APPLICATIONS

The present application claims priority to U.S. Provisional Application No. 63/016,093, filed on Apr. 27, 2020, the entirety of which is hereby incorporated by reference.

TECHNICAL FIELD

The present disclosure generally relates to video content security technologies, and in particular, systems and methods for protecting video content and for detecting and preventing unauthorized playback of video content.

BACKGROUND

In recent years, the video service industry has continued to thrive. Combating digital piracy has been a major challenge for premium content owners and over-the-top (OTT) providers of video streaming services, such as Netflix™ HBO™ and Hulu™. Along with the increasing popularity of media streaming and other video content delivery services, there have been more and more sophisticated ways for pirates to obtain media content illegally and offer pirated material for access. For example, pirated versions of Sacred Games from Netflix™ Game of Thrones from HBO™ appeared on various pirated websites even before their official release. Within the first 24 hours of its release, the season eight premiere of Game of Thrones had nearly 55 million pirated views, most of which were through pirated website streaming.

Many non-technical and technical video content security solutions have been designed to tackle streaming privacy. Non-technical solutions include initiatives to increase consumer awareness of the illegality of piracy and importance of intellectual property protection, competitive service terms for legitimate streaming services, and legal actions curbing and punishing piracy-related offenses such as takedowns through the Digital Millennium Copyright Act (DMCA). With respect to technical solutions, some techniques detect pirated content using watermarking or logo detection. For example, some watermarking techniques add unique watermarking within the video content that can identify the source of the content, so that the genuine copies can be differentiated from pirated material.

However, with the existing anti-piracy solutions, pirated video streams may not be detected by the original content provider until the time pirated material is reported and the source traced. Adding watermarking to the video content does not stop a user from accessing or viewing the pirated material. Visible watermarking can also be removed or obfuscated. By the time the pirated material is located and taken down, it may have already been accessed, viewed, and shared by a large audience. In addition, some anti-piracy solutions are implemented through video service applications associated with the OTT providers. Such solutions will not work if the users do not install the applications on their devices, or do not install security patches embodying the anti-piracy solutions.

In view of the above problems in existing anti-piracy techniques, there is a need for video content security solutions that can efficiently detect and prevent unauthorized playback of video content so that pirating behaviour can be promptly stopped.

SUMMARY

According to some embodiments of the present disclosure, methods for video content security that can be performed by video display devices are provided. According to an exemplary method, a device performing a video playback can acquire a set of video frames from a decoder during the video playback, and generate, based on the set of video frames, a first video identifier. The first video identifier can be sent to a server. In response to the server determining that the first video identifier matches a second video identifier stored in the server, the device can receive a list of authorized playback sources associated with the second video identifier. The device can determine whether a source of the video playback is included in the list of authorized playback sources, and control the video playback based on the determination.

According to some embodiments of the present disclosure, methods for video content security that can be performed by a server are provided. According to one exemplary method, a server stores a plurality of second video identifiers associated with a plurality of pieces of premium video content, and receives a first video identifier associated with a video playback being performed on a device. The server can determine whether the first video identifier matches one of the plurality of second video identifiers. In response to the first video identifier matching one of the plurality of second video identifiers, the server can send to the device, a list of authorized playback sources associated with the one of the plurality of second video identifiers.

According to some embodiments of the present disclosure, systems for video content security are provided. One exemplary system includes a memory storing instructions, and a processor configured to execute the instructions to perform a method for video content security. The method can include the following procedures: acquiring, by a device performing a video playback, a set of video frames from a decoder during the video playback; generating, based on the set of video frames, a first video identifier; sending the first video identifier to a server; in response to the server determining that the first video identifier matches a second video identifier, receiving, from the server, a list of authorized playback sources associated with the second video identifier, wherein the second video identifier is stored in the server; determining whether a source of the video playback is included in the list of authorized playback sources; and controlling the video playback based on the determination.

According to some embodiments of the present disclosure, systems for video content security are provided. One exemplary system includes a memory storing instructions, and a processor configured to execute the instructions to perform a method for video content security. The method can include the following procedures: storing a plurality of second video identifiers associated with a plurality of pieces of premium video content; receiving a first video identifier associated with a video playback being performed on a device; determining whether the first video identifier matches one of the plurality of second video identifiers; and in response to the first video identifier matching one of the plurality of second video identifiers, sending, to the device, a list of authorized playback sources associated with the one of the plurality of second video identifiers.

Other method, device, and system embodiments are further provided. The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Reference will now be made in detail to exemplary embodiments discussed with regard to the accompanying drawings. In some instances, the same reference numbers will be used throughout the drawings and the following description to refer to the same or like parts. The disclosed materials, methods, and examples are illustrative only and are not intended to be limiting.

Video content security solutions for detecting and preventing unauthorized playback of video content are provided. Protecting video content security has been a challenge for premium content owners and OTT providers. Online streaming and torrent downloads by large audiences have become a major threat to legitimate distribution of premium video content. Premium video content can include various video content that is produced for broadcasting to a large audience, such as professionally produced, high-quality video content delivered to subscribers of OTT services. According to some embodiments of the present disclosure, unauthorized playback of video content, such as streaming of pirated content, can be effectively detected while the playback is performed and disrupted to stop further playback. That way, unauthorized playback can be prevented in real time, or near real time, as soon as it is detected. Exemplary solutions and advantages of such solutions are further described below.

Figure 1A:
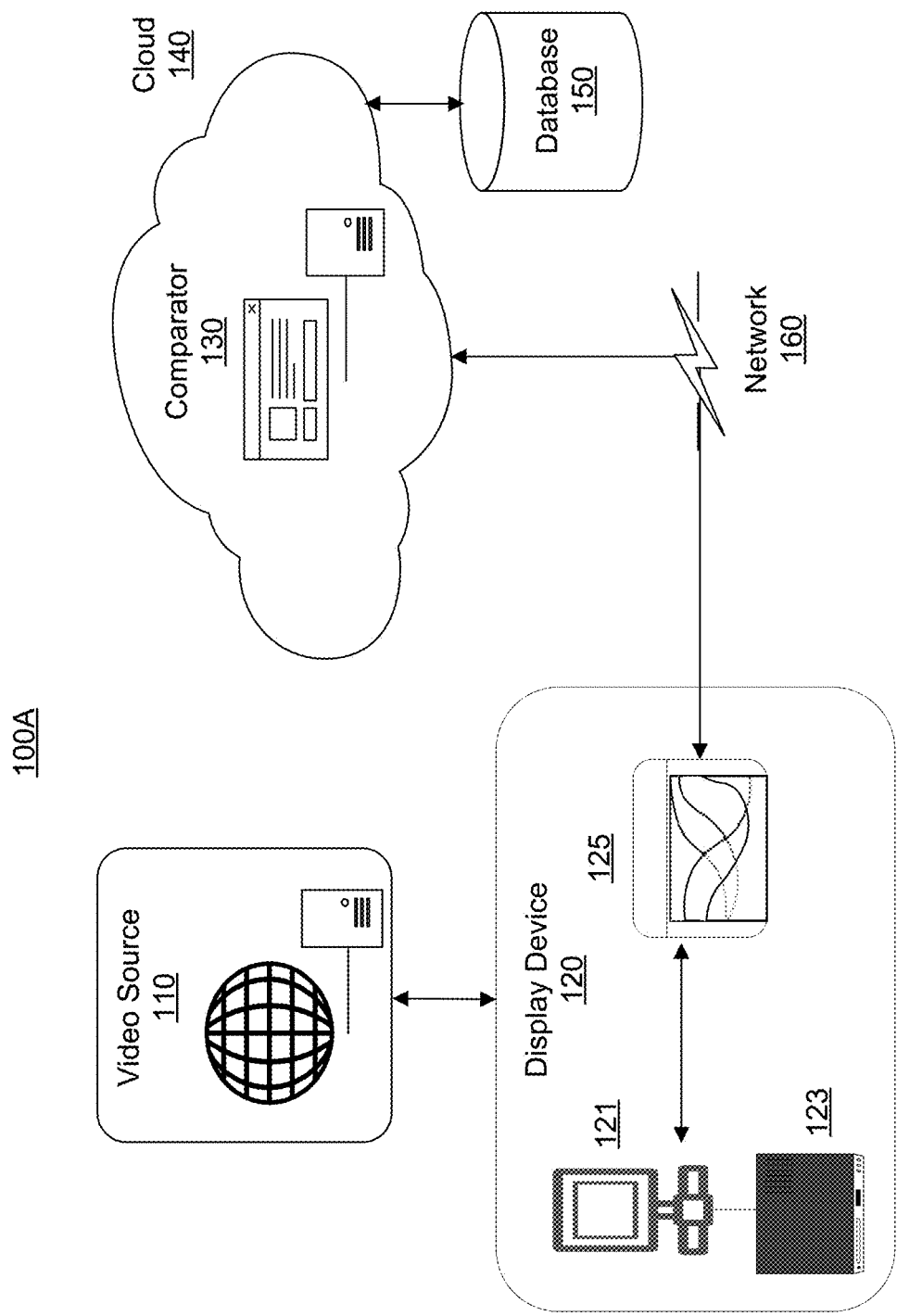
FIG. 1A is diagrammatic representation of an exemplary system for detecting and preventing unauthorized playback of video content, consistent with some embodiments of the present disclosure.

FIG. 1A is a diagrammatic representation of an exemplary system 100A for detecting and preventing unauthorized playback of video content, consistent with some embodiments of the present disclosure. As shown in FIG. 1A, exemplary system 100A includes a video source 110, a display device 120, a comparator 130 which can be a server or an apparatus hosted in a cloud 140, a database 150, and a network 160. The components and arrangements shown in FIG. 1A are only exemplary, as the system components used to implement the disclosed processes and features can vary.

Video source 110 can be a source that provides video content. For example, video source 110 can be various websites or online video service platforms where various video content is hosted. A user may access, view, or download such video content via a network connection. For example, the user may access an online video service platform to download or stream a movie. The user may further store a copy of the movie in a local driver or share with a peer. In some embodiments, video source 110 can be a storage medium where video content is stored and can be accessed and processed by a video display device. For example, video source 110 can be in the form of a video tape, laserdisc, a local or external hard drive, CD or DVDs, SD cards, flash drive, or any another storage associated with or hosted in a computing device.

Display device 120 can include any device that is capable of displaying video content. Consistent with some embodiments, display device 120 may communicate with and obtain video content from video source 110. As shown in FIG. 1A, display device 120 may further include a video decoder 121, a video renderer 123, and a comparator-client module 125. In some embodiments, display device 120 may include a smart phone, a tablet, a computer monitor, a TV, an in-vehicle touch screen display device, or a laptop computer. Video decoder 121 may include a circuit configured to perform inverse functions of a video encoder and convert compressed video content into an uncompressed format. Image frames generated by video decoder can be inputted into video renderer 123 for playing back the decoded video on a display. Comparator-client module 125 is communicatively connected to decoder 121 and can obtain decoded frames from a playback of video content that is being performed by display device 120. The obtained decoded frames can be used by comparator-client module 125 to generate a Video Secure Key (VSK) based on features of the video frames. In some embodiments, the VSK can be an identifier generated based on one or more frames of video content and can uniquely identify properties of the video content. For example, VSKs can be generated based on combinations of: logos included in the video frames, image signatures, and watermarks. Example processes of generating VSKs are further explained below in connection with FIGS. 6, 7A, and 7B.

In some embodiments, comparator-client module 125 can include a trusted processor or hardware components associated with a Trusted Execution Environment (TEE) hosted within a main processor of display device 120. In some embodiments, comparator-client module 125 may also be in the form of a trusted application installed on the device that runs within the TEE. For example, the TEE can provide a secure area within a main processor of display device 120 that runs simultaneously with the operating system of the device. That secure area provides data confidentiality and integrity with respect to the execution performed within. Execution within the TEE is therefore protected with a higher level of security compared to other processing in the same operating system. Arm® TrustZone® TEE is an exemplary implementation of TEE, which offers a hybrid approach that utilizes both hardware and software to ensure data security. In some embodiments, generation of VSKs can be performed within the TEE so that the associated processing and the generated VSKs can be protected from tampering or intervention from other applications running in the same operating system.

Figure 2:
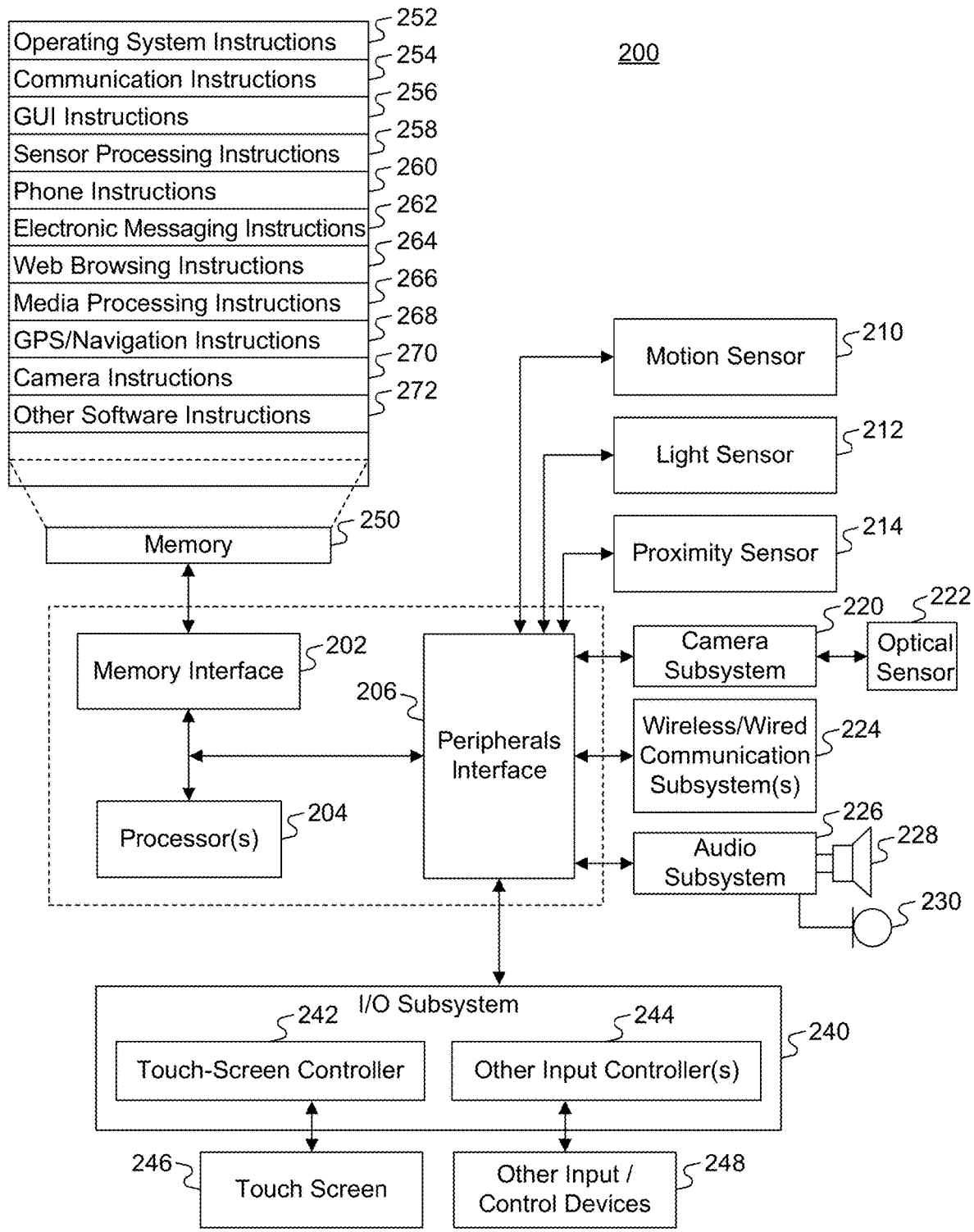
FIG. 2 is a diagrammatic representation of an exemplary display device, consistent with some embodiments of the present disclosure.

It is appreciated that display device 120 may include other components, such as a decoding and rendering component for audio content associated with the video content, video/audio input devices such as a video camera, a web camera, a microphone or the like. The configuration of display device 120 is not limited here. FIG. 2, further described below, provides another example of display device 120 consistent with embodiments of this disclosure.

Comparator 130 can be a server or application associated with a piracy detection or video content security service. Comparator 130 can be in the form of a computer-based system including computer system components, work stations, memory devices, and internal network(s) connecting these components. Comparator 130 can receive one or more VSKs generated by display device 120 through comparator-client module 125. Comparator 130 can further compare the received VSKs (referred to hereinafter as "playback VSKs" solely for ease of description) with VSKs associated with authentic premium video content (referred to hereinafter as "authentic VSKs" solely for ease of description), to determine whether the received VSKs matches the authentic VSKs.

In some embodiments, the authentic VSKs may be provided to comparator 130 or an associated database by legitimate premium content distributors, such as premium content owners or OTT providers. For example, a movie producer may produce a new movie Game of Crown. Before its release, the movie producer may generate a set of VSKs corresponding to the movie content and distribute the VSKs to associated or authorized entities. Additionally or alternatively, the authentic VSKs can be generated by comparator 130 or a server associated with comparator 130. Generation of the authentic VSKs may involve the same or similar logic/processing used in generating playback VSKs. For example, comparator 130 may be operated by a piracy detection service platform. The movie producer may utilize the privacy detection service platform to detect and prevent unauthorized (or pirated) playback of Game of Crown. The movie producer can provide the video content of a part of or the entirety of the movie to the privacy detection service platform. The privacy detection service platform (using comparator 130 or an associated server) can then generate authentic VSKs corresponding to Game of Crown, based on the received video content.

As described above, comparator 130 may have access to authentic VSKs corresponding to various premium video content provided by one or more premium content distributors. When comparator 130 receives playback VSKs from display device 120 that are generated based on a video playback performed on display device 120, comparator 130 can compare the received playback VSKs to the various authentic VSKs to determine whether the playback VSKs match any of the authentic VSKs. If the received VSKs match authentic VSKs corresponding to a piece of premium video content, for example, the movie Game of Crown, that means display device 120 is currently performing playback of a video associated with Game of Crown.

In some embodiments, comparator 130 may be hosted in cloud 140. Cloud 140 can provide a cloud computing platform via the internet and can be accessed remotely. Comparator 130 may further be associated with a database 150. Database 150 can include one or more physical or virtual storages and can be configured to store data associated with processing performed by comparator 130. For example, database 150 can include any combination of one or more databases controlled by memory controller devices (e.g., server(s), etc.) or software, such as document management systems, Microsoft SQL databases, SharePoint databases, Oracle™ databases, Sybase™ databases, or other relational databases or non-relational databases, such as Hadoop™ sequence files, HBase™, or Cassandra™. In some embodiments, database 150 can be configured to store authentic VSKs, playback VSKs received from display devices such as display device 120, and VSK comparison data. While database 150 is illustrated as an external device connected to comparator 130, database 150 may also reside within comparator 130 as an internal component or within cloud 140. In some embodiments, database 150 may include computing components (e.g., database management system, database server, etc.) configured to receive and process requests for data stored in memory devices of the database and to provide data from the database.

Network 160 facilitates communicating and sharing of information between display device 120, comparator 130, and/or other components of system 100A. For example, network 160 may facilitate communication between various online video sources with display device 120. Network 160 may be any type of network that provides communications, exchanges information, and/or facilitates the exchange of information. For example, network 160 may be the Internet, a Local Area Network, a cellular network, a public switched telephone network ("PSTN"), or other suitable connection(s). For example, display device 120 may send the generated playback VSKs to comparator 130 via network 160.

If comparator 130 determines the received VSKs match authentic VSKs associated with a piece of premium video content, comparator 130 can send to display device 120 a list of authorized playback sources associated with that piece of premium video content. That way, display device 120 can determine whether video source 110 is included in the list of authorized playback sources. As an example, the movie producer of Game of Crown may authorize a list of video service platforms, such as TV channels, websites, video service providers, or certain devices conforming to the producer's security policy requirements, to offer Game of Crown for viewing. These video service platforms would be considered as authorized playback sources, because they are authorized by the movie producer to offer Game of Crown in a legitimate manner. If display device 120, for example, by comparator-client module 125, determines that video source 110 is not included in the list of authorized playback sources received from comparator 130, display device 120 may stop the playback in real time.

Figure 1B:
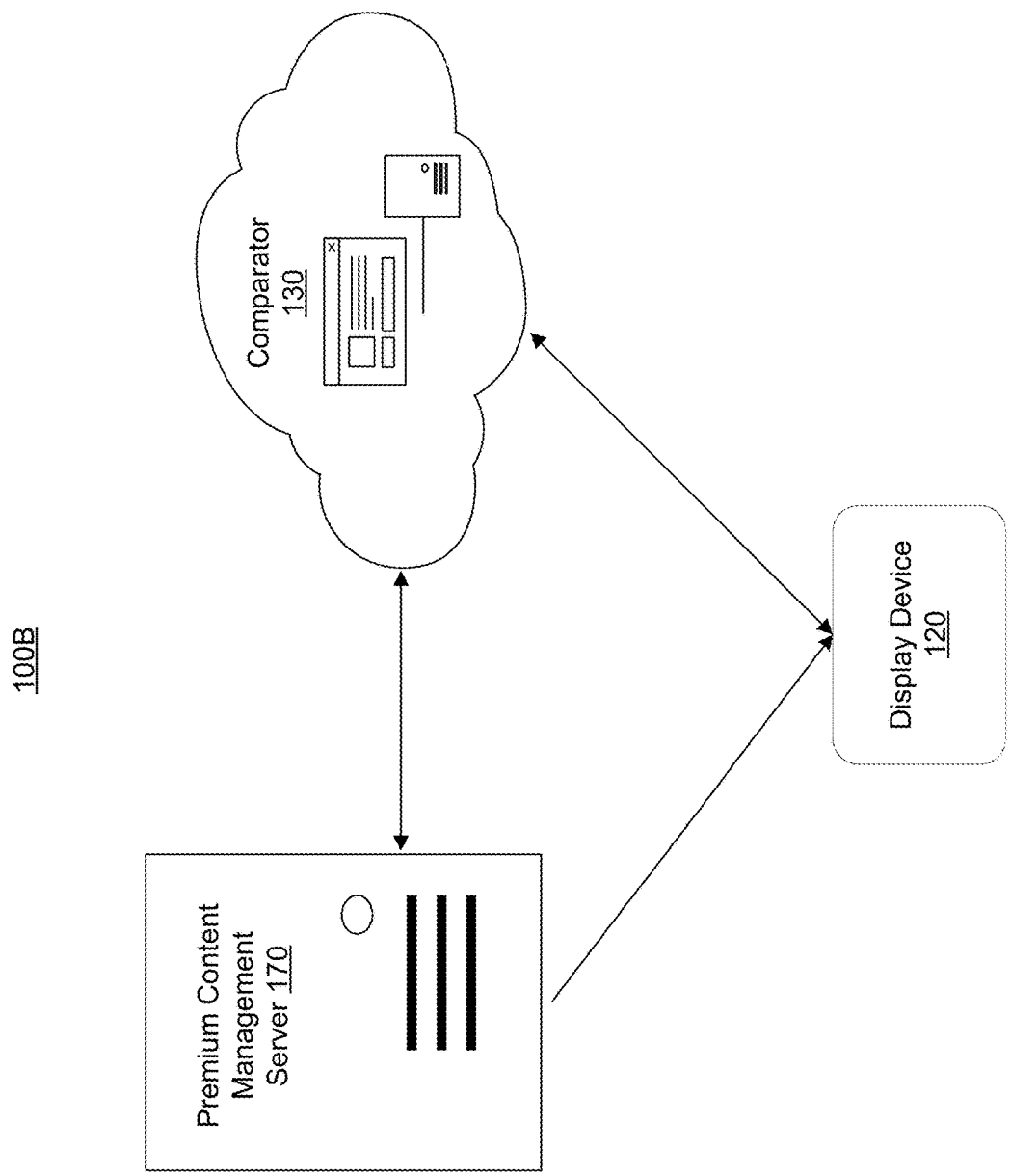
FIG. 1B is diagrammatic representation of an exemplary system for detecting and preventing unauthorized playback of video content, consistent with some embodiments of the present disclosure.

FIG. 1B is an exemplary system 100B for detecting and preventing unauthorized playback of video content, consistent with some embodiments of the present disclosure. As shown in FIG. 1B, comparator 130 may be in communication with one or more premium content management servers associated with video service providers. In exemplary system 100B, comparator 130 communicates with premium content management server 170. Premium content management server 170 may be configured to manage premium video content for a particular video service provider. For example, premium content management server 170 may implement video content security solutions through VSK comparison. When comparator 130 receives playback VSKs from display device 120, comparator 130 may redirect or forward the playback VSKs to premium content management server 170 for further comparison with authentic VSKs corresponding to the premium content managed thereby. The comparison processing performed by premium content management server 170 may be similar to that performed by comparator 130 in system 100A as described above with reference to FIG. 1A. If premium content management server 170 determines the playback VSKs match authentic VSKs corresponding to a piece of premium video content it manages, it can send, directly or indirectly, a list of authorized playback sources associated with that piece of premium video content to display device 120.

It is appreciated that FIGS. 1A and 1B are exemplary only and systems 100A and 100B may include additional or alternative configurations, which are not limited herein. Further, in some embodiments, processing described as being performed by one component of the system can be performed by another component. For example, processing performed by comparator 130 may be hosted by display device 120, such as in a TEE or by comparator-client module 125. In some embodiments, processing performed by comparator-client module 125 may only be required to achieve piracy detection in offline mode (without internet connection), such as when the playback video source is obtained from a local storage (e.g., a local drive or video disk). In such a scenario, an internal comparator module (such as comparator-client module 125) within the display device chip's trusted/secure environment can be used.

FIG. 2 is a diagrammatic representation of an exemplary display device 200, consistent with some embodiments of the present disclosure. Display device 200 can be used to implement computer programs, applications, methods, processes, or other software to perform embodiments described in the present disclosure. Display device 200 can serve as display device 120 described above with reference to FIGS. 1A and 1B. As shown in FIG. 2, display device 200 includes a memory interface 202, one or more processors 204, such as data processors, image processors and/or central processing units, and a peripherals interface 206. Memory interface 202, one or more processor(s) 204, and/or peripherals interface 206 can be separate components or can be integrated in one or more integrated circuits. The various components in display device 200 can be coupled by one or more communication buses or signal lines. One or more of the processor(s) 204 can be a trusted processor or a processor hosting a TEE, as described above with reference to FIG. 1A, for secure execution of processing related to VSK generation and transmission.

Sensors, devices, and subsystems can be coupled to peripherals interface 206 to facilitate multiple operations. For example, a motion sensor 210, a light sensor 212, and a proximity sensor 214 can be coupled to peripherals interface 206 to facilitate orientation, lighting, and proximity functions. Other sensors can also be connected to peripherals interface 206, such as a positioning system (e.g., GPS receiver), a temperature sensor, a biometric sensor, or other sensing device, to facilitate related functionalities. A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips. In cases where display device 200 is implemented in the form of a smart phone, various other sensors can be built into the device.

Communication functions may be facilitated through one or more wireless/wired communication subsystems 224, which can include an Ethernet port, radio frequency receivers and transmitters, and/or optical (e.g., infrared) receivers and transmitters. The specific design and implementation of wireless/wired communication subsystem 224 depends on the communication network(s) over which display device 200 is intended to operate. For example, in some embodiments, display device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

An I/O subsystem 240 can include a touch screen controller 242 and/or other input controller(s) 244. Touch screen controller 242 can be coupled to a touch screen 246. Touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. Touch screen 246 can be used to display the decoded and rendered video playback for user viewing. While touch screen 246 is shown in FIG. 2, I/O subsystem 240 may include a display screen (e.g., CRT or LCD) in place of touch screen 246.

Other input controller(s) 244 are coupled to other input/control devices 248, such as one or more buttons, rocker switches, thumb-wheel, infrared port, USB port, and/or a pointer device such as a stylus. Touch screen 246 can, for example, also be used to implement virtual or soft buttons and/or a keyboard.

Memory interface 202 can be coupled to a memory 250. Memory 250 can include high-speed random access memory and/or nonvolatile memory, such as one or more magnetic disk storage devices, one or more optical storage devices, and/or flash memory (e.g., NAND, NOR). Memory 250 can store an operating system 252, such as DARWIN, RTXC, LINUX, iOS, UNIX, OS X, WINDOWS, or an embedded operating system. Operating system 252 can include instructions for handling basic system services and for performing hardware dependent tasks. In some implementations, operating system 252 can be a kernel (e.g., a UNIX kernel).

Memory 250 may also store communication instructions 254 to facilitate communicating with one or more additional devices, one or more computers and/or one or more servers, such as comparator 130 as described above with reference to FIG. 1A. Memory 250 can include graphical user interface (GUI) instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

Each of the above identified instructions and software applications may correspond to a set of instructions for performing one or more functions described herein. For example, media processing instructions 266 may include instructions for decoding and rendering video content obtained from a video source, such as video source 110 described above with reference to FIG. 1A. The video content can be transmitted through wireless/wired communication subsystems 224 to display device 200 and can further be stored in memory 250. The video content can then be displayed on touch screen 246. Processor(s) 204 can obtain decoded frames for generating playback VSKs corresponding to the video playback. The instructions corresponding to the functions described herein may be implemented as separate software programs, procedures, or modules. Memory 250 may include additional instructions or fewer instructions. Furthermore, various functions of display device 200 may be implemented in hardware and/or in software, including in one or more signal processing and/or application specific integrated circuits.

Figure 3:
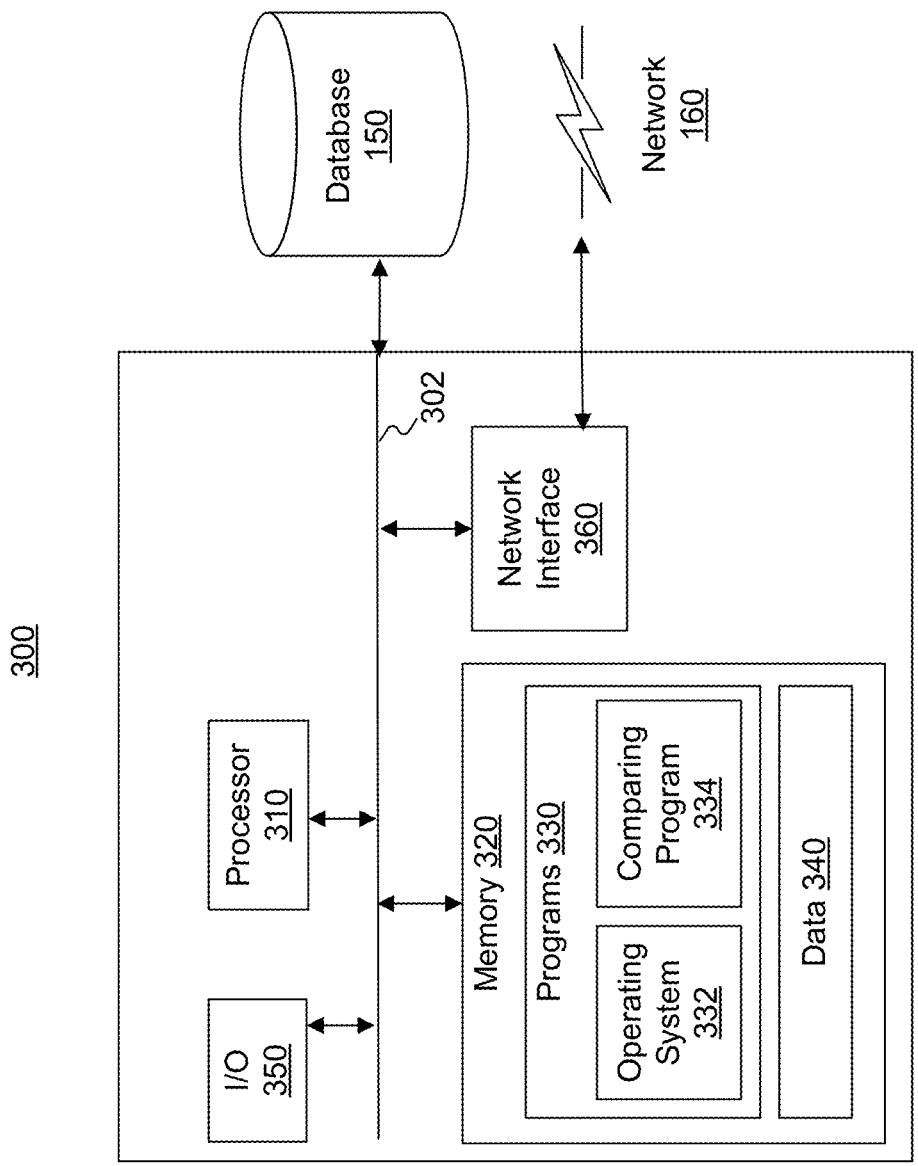
FIG. 3 is a diagrammatic representation of an exemplary comparator, consistent with some embodiments of the present disclosure.

FIG. 3 is a diagrammatic representation of an exemplary comparator 300 implemented in the form of a server, consistent with some embodiments of the present disclosure. Comparator 300 may be a single server or may be configured as a distributed computer system including multiple servers, server farms, clouds, or computers that interoperate to perform one or more of the processes and functionalities associated with the disclosed embodiments. Comparator 300 can serve as comparator 130 described above with reference to FIG. 1A.

As shown in FIG. 3, comparator 300 includes a bus 302 (or other communication mechanism) which interconnects subsystems or components for transferring information within comparator 300. Comparator 300 further includes one or more processors 310, one or more memories 320 storing programs 330 and data 340, input/output ("I/O") devices 350, and a network interface 360. Programs 330 can include, for example, an operating system 332 and a comparing program 334. Network interface 360 can include a modem, Ethernet card, or any other interface configured to exchange data with network 160 as shown in FIG. 1A. Comparator 300 can further be associated with database 150 as shown in FIG. 1A.

Processor 310 may be one or more processing devices configured to perform methods and functionalities disclosed herein, such as a microprocessor manufactured by Intel™ or AMD™. Processor 310 may comprise a single core or multiple core processors executing parallel processes simultaneously. For example, processor 310 may be a single core processor configured with virtual processing technologies. In some embodiments, processor 310 may use logical processors to simultaneously execute and control multiple processes. Processor 310 may implement virtual machine technologies, or other technologies to provide the ability to execute, control, run, manipulate, store, etc., multiple software processes, applications, programs, etc. In some embodiments, processor 310 may include a multiple-core processor arrangement (e.g., dual core, quad core, etc.) configured to provide parallel processing functionalities to allow comparator 300 to execute multiple processes simultaneously. It is appreciated that other types of processor arrangements could be implemented that provide for the capabilities disclosed herein.

Memory 320 may be a volatile or nonvolatile, magnetic, semiconductor, tape, optical, removable, non-removable, or other type of storage device or tangible or non-transitory computer-readable medium that stores one or more program(s) 330 such as operating system 332 and comparing program 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Programs 330 include one or more software modules configured to cause processor 310 to perform one or more functions consistent with the disclosed embodiments. Moreover, processor 310 may execute one or more programs located remotely from one or more components of comparator 300. For example, comparator 300 may access one or more remote programs that, when executed, perform functions related to disclosed embodiments.

Programs 330 further include operating system 332 performing operating system functions when executed by one or more processors such as processor 310. By way of example, operating system 332 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 332. Comparator 300 may also include software that, when executed by a processor, provides communications with network 160 through network interface 360 and/or a direct connection to one or more user devices, such as display devices 120.

Comparing program 334 can include one or more software modules for performing comparison between playback VSKs received from display devices such as display device 120, and authentic VSKs corresponding to premium video content, to determine whether there is a match. For example, the similarity between the VSKs can be measured by a difference value between a playback VSK and an authentic VSK, such as a hamming distance between the two VSKs. Examples of the comparison process are further explained below with reference to FIGS. 5 and 8.

In some embodiments, comparator 300 may be configured to manage various premium video content and can store various VSKs corresponding to each piece of premium video content. To improve efficiency of the comparison process, machine learning models can be used to narrow the scope of potential similar VSKs. Comparison can then be performed against the identified potential similar VSKs. That way, computing resources required for the VSK comparison process can be reduced, and a matching VSK can be more efficiently identified. As an example, premium video content may be categorized into different categories and subcategories. The categorization can be based on the subject matter, release time (or time of first broadcast), cast members, producer, country of origin, etc., of the video content. As an example, based on the subject matter of the video content, premium video content can be categorized into action or adventure, anime, movie, comedy, cult movie, drama, documentary, music, sci-fi and fantasy, sports, or TV shows. Each category may further include different subcategories. For example, TV shows can further include crime TV shows, military TV shows, food and travel, TV horrors, teen TV shows, etc. Similarly, premium content can also be categorized based on their producer, broadcaster, or distributor, such as video content produced by Netflix® or HBO®. In some embodiments, premium video content can be organized based on different categorizations, and one piece of video content can correspond to different categories or subcategories, which are not limited herein. For example, one piece of video content can be categorized as shows by HBO® based on the distributor, horror movie based on the subject matter, shows of 2019 based on the time of first broadcast, shows directed by director X and shows including actor Y.

When a playback VSK is received by comparator 300, comparator 300 can first determine the categories or subcategories that may potentially include a matching authentic VSK, to identify a subgroup within the various authentic VSKs for further comparison. Identification of this subgroup can be based on any combination of: the received VSK, one or more characteristics of the video playback such as features of the corresponding frames, information relating to the description of the playback, or information related to the user account such as video viewing history or viewing preference. For example, a pirated HBO® video may bear a corresponding description indicating "HBO" in the logo section or in the description of the title as provided by video source 110. Video content distributed by HBO® can be identified and included in the subgroup of authentic VSKs to be compared with the received playback VSK. Identification of the subgroup can further be based on information associated with the user. For example, based on the account information and video viewing history of the user, display device 120 or comparator 130 may determine that the user has a preference for sci-fi fantasy shows based on the percentage of sci-fi fantasy content the user has viewed. Comparator 300 can use sci-fi fantasy as an additional criterion for identifying the subgroup of authentic VSKs for comparison with the received VSK. Various machine learning models can be used to efficiently identify the subgroup of VSKs, such as neural networks, recurrent neural networks, convolutional neural networks, generative adversarial networks, decision trees, and models based on ensemble methods, such as random forests.

Data 340 may include various information associated with processing performed by processor 310. For example, in some embodiments, data 340 may include playback VSKs received by comparator 300 from display device 120 and other information related to the video playback, such as date and time of the playback, playback progress, information identifying video source 110, and information identifying display device 120 and the associated user account. In some embodiments, data 340 may further store information about video viewing history associated with the user account, including premium content the user has viewed, user preference for certain categories of video content, and information related to previous viewing of pirated material. Such data can be further analyzed to assist with future piracy detection. In some embodiments, data 340 may further include lists of authorized playback sources corresponding to the various authentic VSKs. When comparator 130 determines a received playback VSK matches an authentic VSK corresponding to a particular piece of premium video content, comparator 130 can determine a list of authorized playback sources that are authorized to offer that piece of premium video content. It is appreciated that data 340 may include information similarly stored in database 150 and may share or synchronize data with database 150.

I/O devices 350 can have one or more interfaces for receiving signals or input from devices and providing signals or output to one or more devices that allow data to be received and/or transmitted by comparator 300. For example, comparator 300 may include interface components for interfacing with one or more input devices, such as one or more keyboards, mouse devices, and the like, that enable comparator 300 to receive input from an operator or administrator (not shown). It is appreciated that the configuration shown in FIG. 3 is exemplary only, and comparator 300 may include alternative or additional components, which are not limited by the present disclosure.

Figure 4:
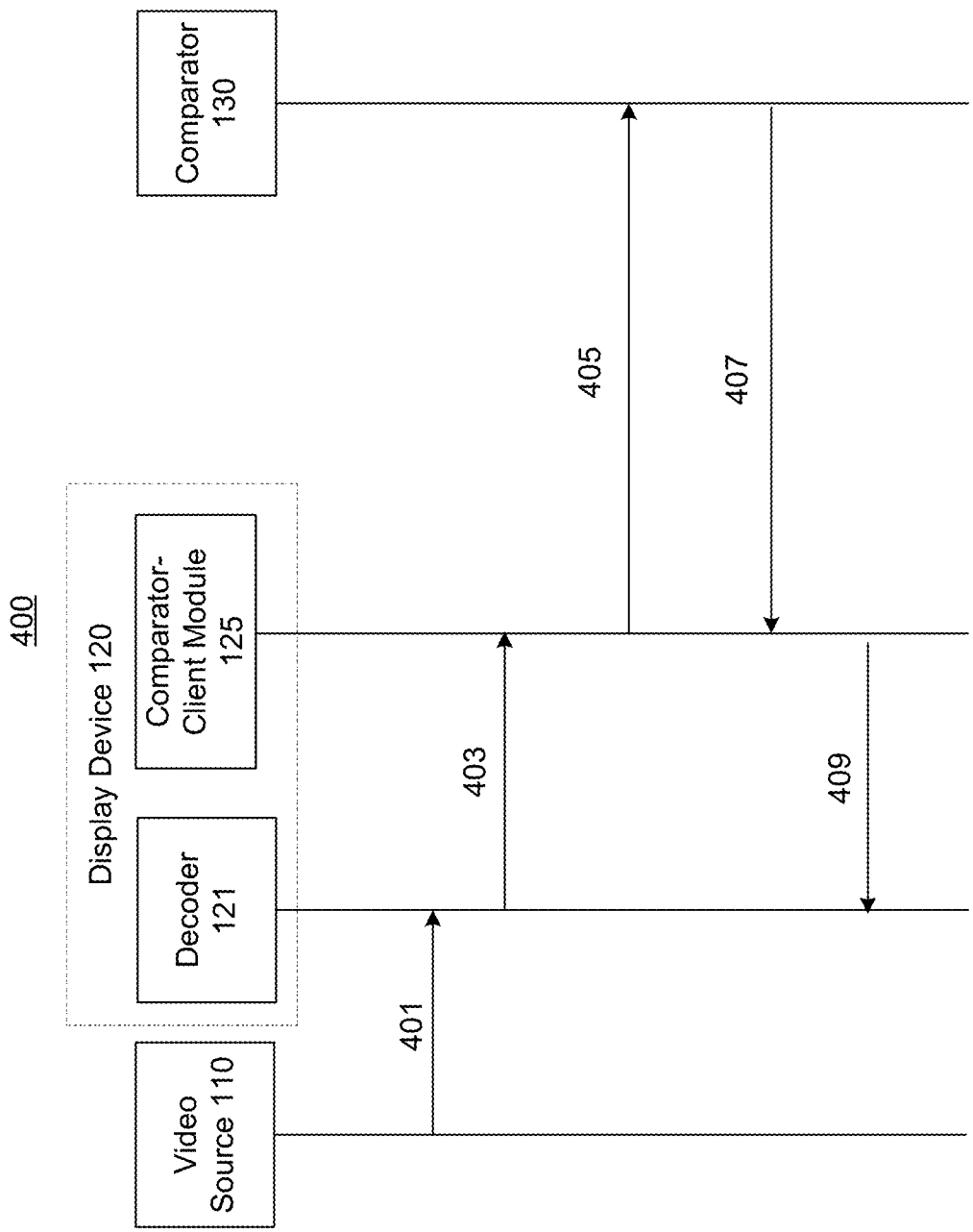
FIG. 4 is diagrammatic representation of interactions between different components of a system for detecting and preventing unauthorized playback of video content, consistent with some embodiments of the present disclosure.

FIG. 4 is diagrammatic representation of exemplary interactions 400 between different components of a system for detecting and preventing unauthorized playback of video content, consistent with some embodiments of the present disclosure. The components as described above in system 100A with reference to FIG. 1A are used here as an example and for ease of description. As shown in FIG. 4, the interactions include steps 401-409.

In step 401, display device 120 obtains video content from video source 110. Obtaining video content from video source 110 can be through a streaming service, downloading, or torrenting, which is not limited herein. In some embodiments, video source 110 may be obtained from a memory component within display device 120. Display device 120 can perform a video playback of the obtained video content.

In step 403, comparator-client module 125 obtains one or more decoded video frames from decoder 121. Based on one or more of the obtained decoded frames, comparator-client module 125 can generate one or more playback VSKs.

In step 405, comparator-client module 125 sends the generated playback VSK(s) to comparator 130. Comparator 130 can then determine whether the generated playback VSK matches one of a plurality of authentic VSKs corresponding to premium video content.

In some embodiments, after comparator-client module 125 sends the generated playback VSK to comparator 130, it may receive a signed acknowledgement signal (ACK) from comparator 130 indicating receipt of the playback VSK. Receiving a signed ACK can help ensure that the playback VSK is successfully sent and is not diverted to another entity or tampered with during the transmission. For example, for each playback VSK generated by comparator-client module 125 and sent to comparator 130, a corresponding signed ACK can be received from comparator 130. As a result, if any playback VSK is intercepted or redirected to another network entity during the transmission process (and the signed ACK is not received by comparator-client module 125 from comparator 130), it can be promptly detected based on the lack of ACK.

In step 407, if comparator 130 determines that the received playback VSK matches one of the plurality of authentic VSKs, comparator 130 sends a list of authorized playback sources corresponding to that authentic VSK to display device 120. For example, comparator 130 may determine the received playback VSK matches an authentic VSK corresponding to Game of Crown. Comparator 130 can then send a list of authorized playback sources of Game of Crown to display device 120. The list can be sent to comparator-client module 125 within display device 120.

In step 409, if comparator-client module 125 determines that video source 110 is not included in the authorized playback sources received from comparator 130, comparator-client module 125 may issue an instruction to decoder 121 (through a processor of display device 120) to disrupt the playback. For example, the instruction may instruct decoder 121 to stop decoding the video content and thereby disable video playback. It is appreciated that interactions 400 as shown in FIG. 4 are exemplary only. Consistent with some embodiments of this disclosure, alternative or additional processing may be included.

Figure 5:
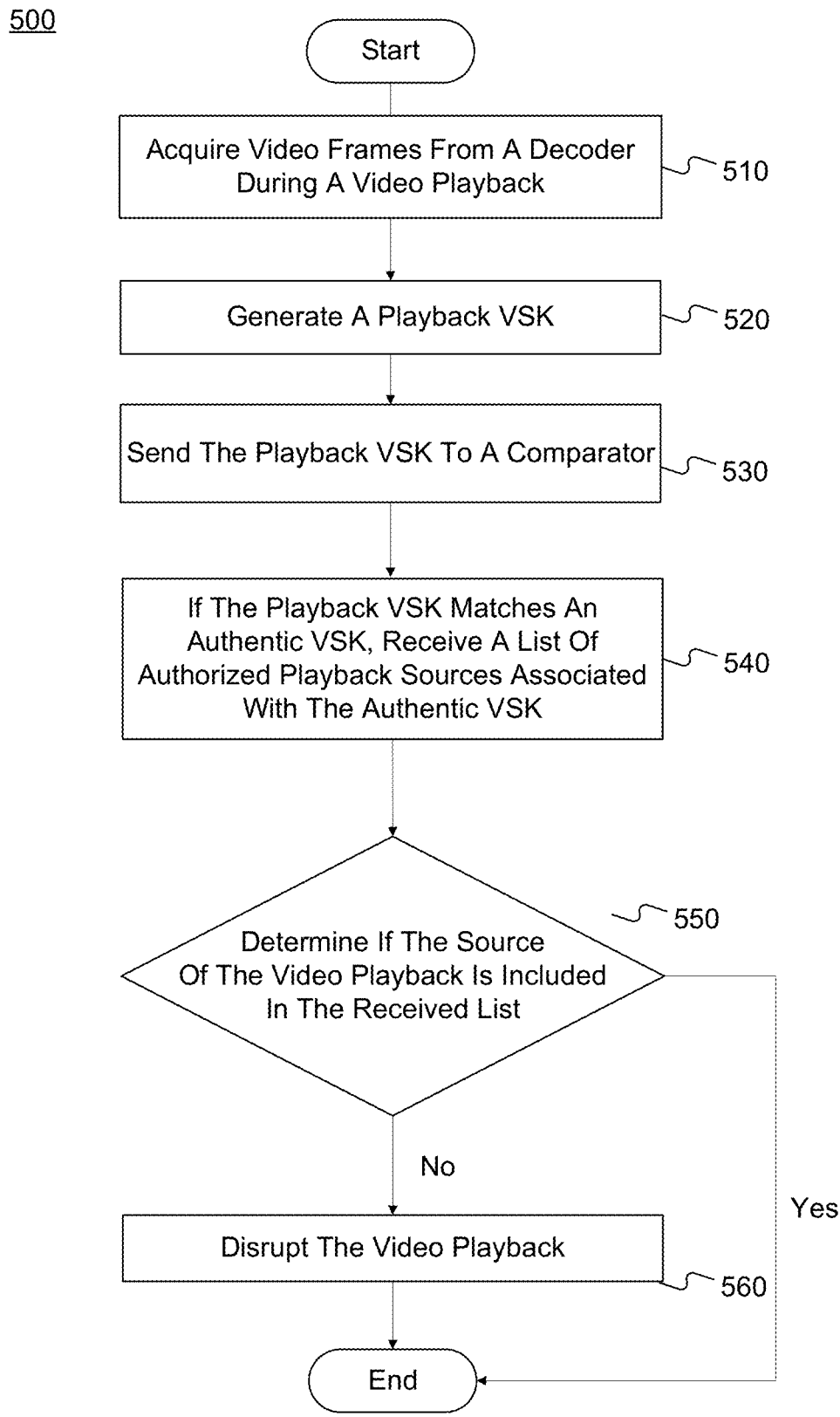
FIG. 5 is an exemplary process of detecting and preventing unauthorized playback of video content, consistent with some embodiments of the present disclosure.

FIG. 5 is an exemplary process 500 for detecting and preventing unauthorized playback of video content, consistent with some embodiments of the present disclosure. In some embodiments, process 500 can be performed by display device 120. As shown in FIG. 5, process 500 includes steps 510-560.

In step 510, comparator-client module 125 within display device 120 acquires video frames from a decoder (such as decoder 121) during a video playback. For example, after a user starts streaming video content, decoder 121 decodes the content and generates decoded image frames. Comparator-client module 125 can obtain a set of decoded video frames directly from decoder 121. The decoded video frames can be obtained immediately after they are generated so that piracy detection can be performed right away or in near real time as the playback is being performed. In some embodiments, transmission of the decoded frames from decoder 121 to comparator-client module 125 can be performed through a secure path, to ensure security and avoid tampering.

In step 520, comparator-client module 125 generates a playback VSK based on the obtained video frames. In some embodiments, one VSK can correspond to one decoded video frame, and multiple VSKs corresponding to different decoded video frames can be provided to comparator 130 for comparison.

In some embodiments, one VSK may be generated for each decoded frame. Alternatively, VSKs may be generated for certain frames selected from the acquired decoded frames. For example, frames with distinct or dynamic image features may be selected for generating VSKs. Frames having full-screen solid colors, such as full-screen black/white image frames, or other frames that lack differentiating features may be skipped or discarded, because such generic frames may be included in various premium video content. VSKs generated based on such frames may therefore match VSKs included in various premium video content, thus rendering little help with identifying a particular piece of premium video content that corresponds to the video playback.

In some embodiments, to ensure VSKs can be generated in real time or near real time based on the decoded frames, a computation time threshold for generating a VSK based on one decoded frame may be set. The threshold can be adjustable based on the specific implementation. For example, the computation time threshold for comparator-client module 125 to generate one VSK can be set to be half or one millisecond. If for a certain frame, the computation time for generating the VSK exceeds the threshold, the frame can be discarded. Another decoded frame (such as the most recently decoded frame) may be selected for generating a VSK. That way, latency involved in the detection process can be minimized.

In step 530, display device 120 sends the generated playback VSK to comparator 130. Transmission of the generated playback VSK can be performed by comparator-client module 125 or in a TEE, to avoid tampering or intervention. In some embodiments, to ensure security of the transmission process, the generated playback VSK can be encrypted. Display device 120 can send the encrypted playback VSK to comparator 130. In addition, as described above for step 405, after comparator-client module 125 sends the generated playback VSK to comparator 130, it may receive a signed ACK from comparator 130 indicating receipt of the playback VSK. This can help ensure that the playback VSK is successfully received by comparator 130 and is not diverted to another entity or tampered with during the transmission.

In step 540, if comparator 130 determines the playback VSK matches an authentic VSK, display device 120 receives a list of authorized playback sources associated with the authentic VSK. For example, if comparator 130 determines that the playback VSK matches the authentic VSK corresponding to Game of Crown, comparator 130 can then send to display device 120 a list of authorized playback sources of Game of Crown.

In step 550, display device 120 determines whether the source of the video playback is included in the list of authorized playback sources. That is, if the source of the video playback is not listed, it indicates that the source is not from a legitimate source and can be pirated content.

In step 560, if it is determined that the source of the video playback is not included in the list of authorized playback sources, display device 120 can disrupt the video playback and stop the user from further viewing the content. With the solutions provided herein, unauthorized playback of video content (such as viewing of pirated content) can be stopped in real time, or near real time. Given the processing time required for generating playback VSKs and comparison of VSKs, very little latency may be involved. Once VSKs are compared and matched, the video playback can be stopped and therefore piracy behavior can be effectively curbed.

Figure 6:
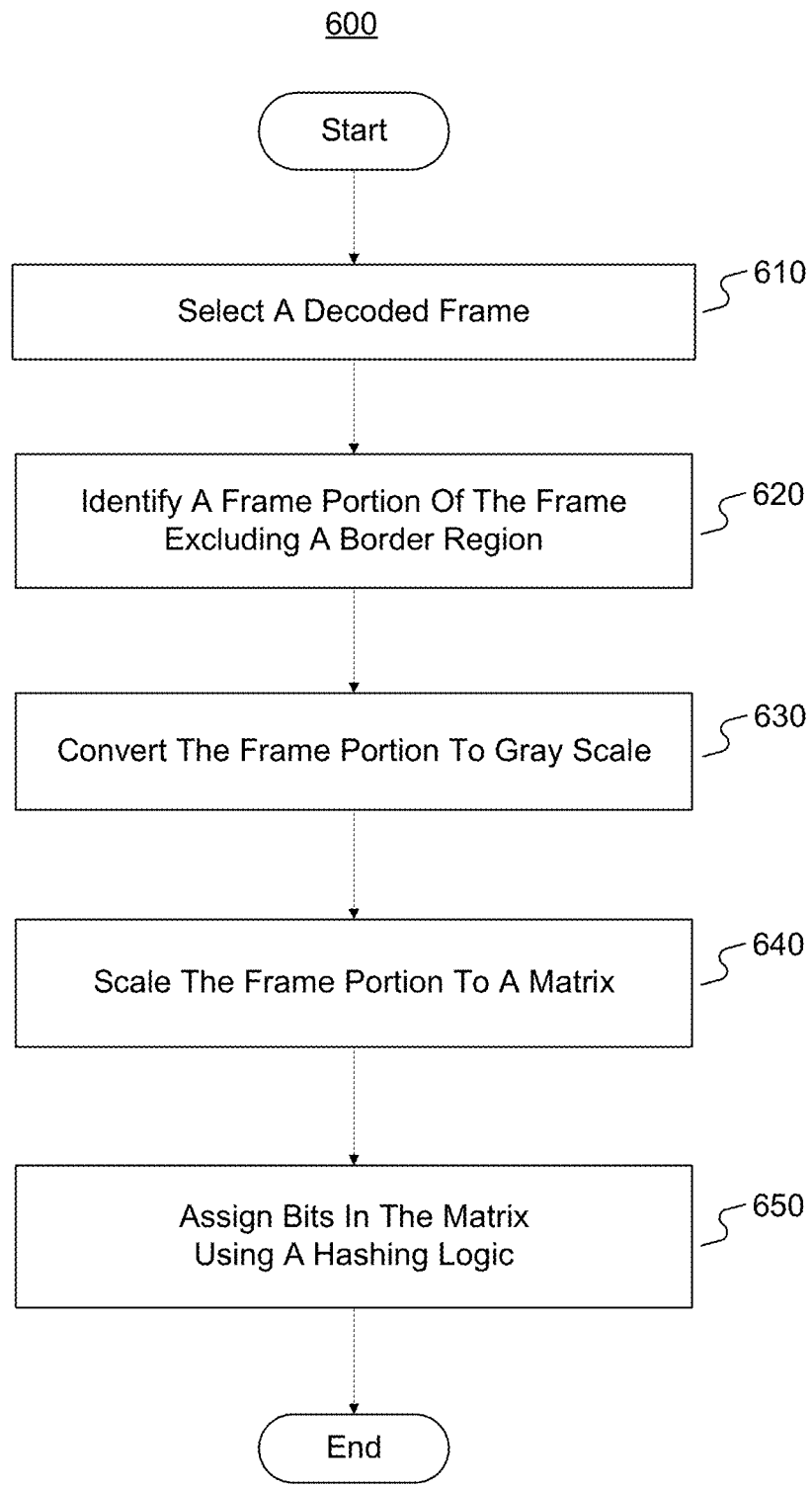
FIG. 6 is an exemplary process of generating an image signature, consistent with some embodiments of the present disclosure.

FIG. 6 is an exemplary process 600 for generating an image signature, consistent with some embodiments of the present disclosure. The generated image signature can be used to generate a playback VSK. In some embodiments, process 600 can be performed by display device 120, for example, using comparator-client module 125. As shown in FIG. 6, process 600 includes steps 610-650.

In step 610, a decoded frame is selected from a set of decoded frames acquired from decoder 121. In some embodiments, one decoded frame can be obtained for frames captured every second. In other words, the frequency of obtaining decoded frames can depend on the frame rate of the video content. For example, if the video content plays at 60 fps, then one frame can be obtained in every 60 frames. Similarly, if the video content plays at 30 fps, one frame can be obtained in every 30 frames. The frequency of obtaining decoded frames can further be adjusted based on the requirements of the specific implementation, which is not limited herein.

Figure 7A:
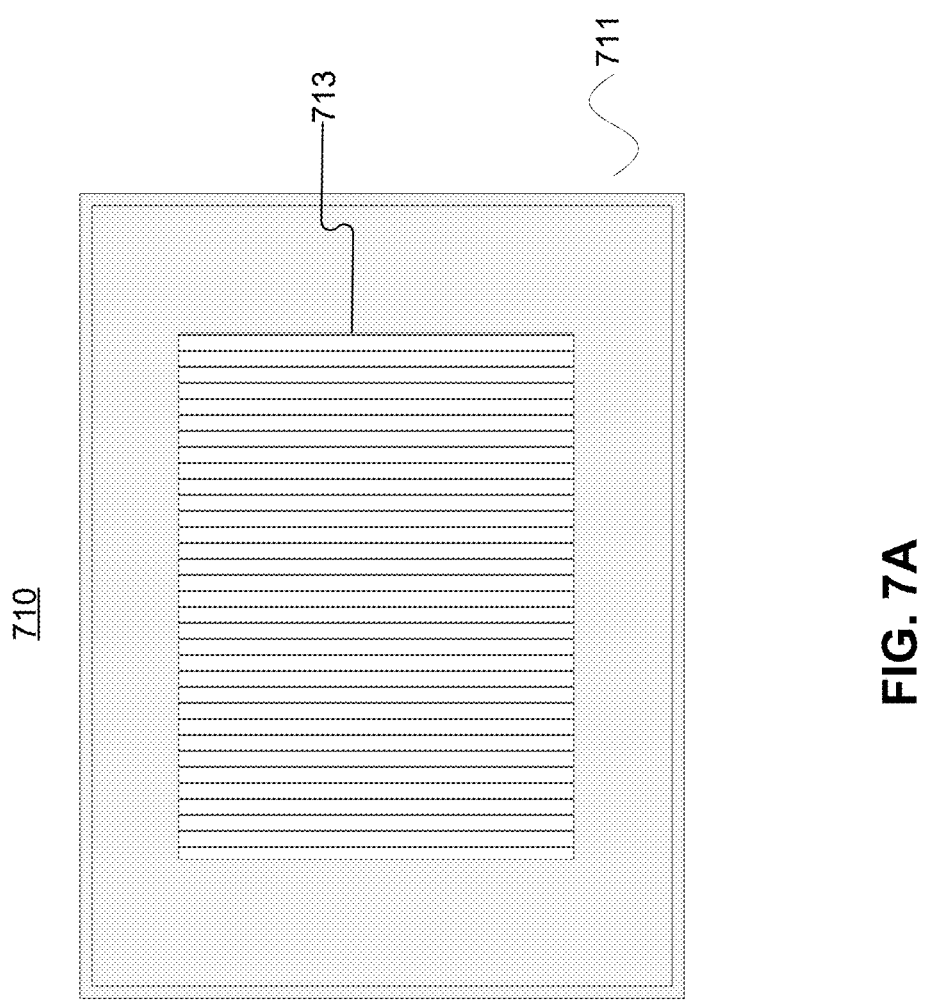
FIG. 7A is a diagrammatic representation of a frame portion used to generate a video secure key, consistent with some embodiments of the present disclosure.
Figure 7B:
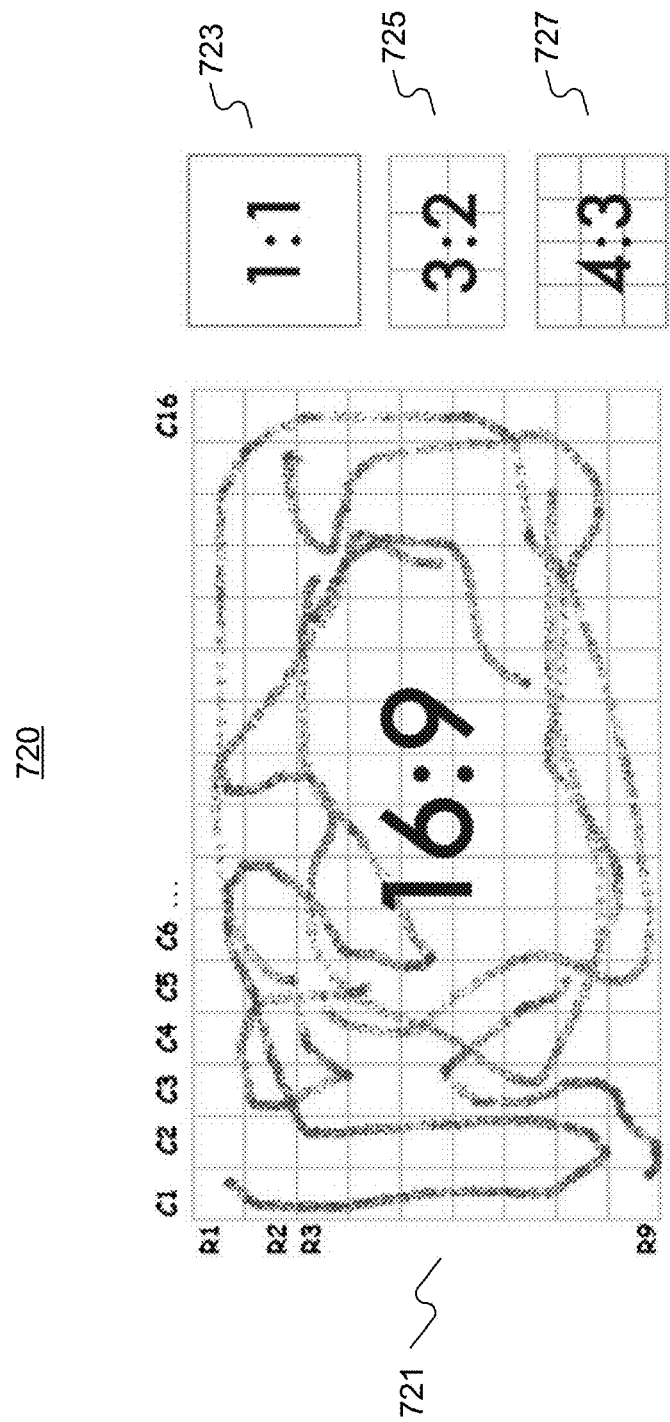
FIG. 7B is a diagrammatic representation of another frame portion used to generate a video secure key, consistent with some embodiments of the present disclosure.

In step 620, a frame portion of the frame is identified, the frame portion excluding a border region of the frame. In some embodiments, the identified frame portion can exclude, for example, around 20% (or another percentage) margin of the frame on top, bottom, left and right. FIG. 7A shows an example implementation of identifying a frame portion within the frame. As shown in FIG. 7A, comparator-client module 125 obtains a decoded frame 711. A frame portion 713 is identified based on frame 711. Frame portion 713 can have the same center point as frame 711, while excluding border regions. Frame portion 713 can have the same aspect ratio as the frame 711. For example, if the aspect ratio of frame 711 is 16:9, the identified frame portion 713 can be 16:9 as well.

Excluding border regions can help eliminate noise caused by image elements that may be added or manipulated based on the original video content, or elements subject to constant change. For example, such elements can include operator/ broadcaster logos; subtitles of various languages, fonts, and sizes; changing scores displayed on a score board; and scroll banners of news feeds or advertisements. As an example, some users may turn on subtitles when they watch certain video content. The subtitles may be set to occupy a top region of the screen or a bottom part of the screen and may further be of different languages. Removing the border region with potential subtitles can prevent generation of playback VSKs based on the same video content from being intervened by noise introduced by presence of different subtitles. Piracy detection therefore will be not circumvented or impacted by addition or variation of the subtitles in the video content.

In some embodiments, authentic VSKs corresponding to premium video content can be generated using similar processing. The window size of image frame used to create authentic VSKs ahead of time can be larger than (or equal to) the window size that comparator-client module 125 uses to compute playback VSKs in real time. In case where different sizes of windows are used, a sliding window mechanism can be implemented to search a smaller window within the scope of a bigger one to detect content recorded with, for example, a slightly unsteady & unaligned camcorder. For example, some pirated content can be created by recording video content using a camcorder smuggled into advance movie screenings. The recorded content may include only a portion of the screen or with certain portions of the screen obstructed at times, as the camcorder may be unsteady or unaligned during the recording process.

In step 630, comparator-client module 125 converts the identified frame portion to gray scale. One advantage of converting the identified frame portion to gray scale is to eliminate interruptions caused by color frequency variation.

In step 640, the converted frame portion is compressed and scaled to a matrix of 8×8, if the aspect ratio the frame portion is 4:3, or a matrix of 16×9, if the aspect ratio of the frame portion is 16:9.

In step 650, bits are assigned to the matrix using a hashing logic to generate an image signature. In some embodiments, bits can be assigned vertically first and then horizontally in the matrix based on change of non-dimensional pixel gradients or resolution. Non-dimensional pixel gradients can refer to gradients which indicate only the change in pixel darkness but not the direction towards the pixel darkness. In some embodiments, aspect ratios of video content are greater than 1 (for example, 4:3 or 16:9). An image signature for which bits are assigned vertically first can therefore produce a more accurate representation of the image features and facilitate faster identification of matching cases. As shown in the example in FIG. 7B, a frame 721 (which can also be a frame portion) has an aspect ratio of 16:9, which is widely used such as for images used in wide screen TVs. Frames 723-727 have aspect ratios of 1:1, 3:2, and 4:3 respectively. Images used in social media profile photos may have an aspect ratio of 1:1 (723). Images from 35 mm films may have an aspect ratio of 3:2 (725). Some video images used on TVs or digital cameras may have an aspect ratio of 4:3 (727). For frame 721, there are 16 vertical columns C1-C16, and 9 horizontal rows R1-R9. If vertical columns are considered first in the bit assignment process, more information can be extracted with a set number of bytes. For example, when 18 bytes are read, information about 2 columns (C1 and C2) can be extracted. In contrast, if the horizontal rows are considered first in the bit assignment process, with 18 bytes, information about only one row can be fully extracted. In other words, if bits are assigned vertically first, more entropy of image noise can be obtained with less bytes being read.

Both the playback VSKs and the authentic VSKs can be generated based on the image signature. For example, after the bits are assigned for an 8×8 matrix, a 128-byte image signature can be obtained (64 (vertical)+64 (horizontal)). Similarly, for a 16×9 matrix, a 288-byte image signature can be obtained (144 (vertical)+144 (horizontal)). The generated image signature can be used as the playback VSK. Additional playback VSKs can be generated based on other frames of the video playback. That is, a set of VSKs can be generated based on the same video. In some embodiments, the playback VSK can be generated based on the image signature as well as additional elements such as a logo included in the frame or a watermark included in the frame. For example, some frames of video content may include a logo of the producer or distributor. The logo features can be identified and used for generating the playback VSK. Various logo detection techniques can be used are not limited herein.

Figure 8:
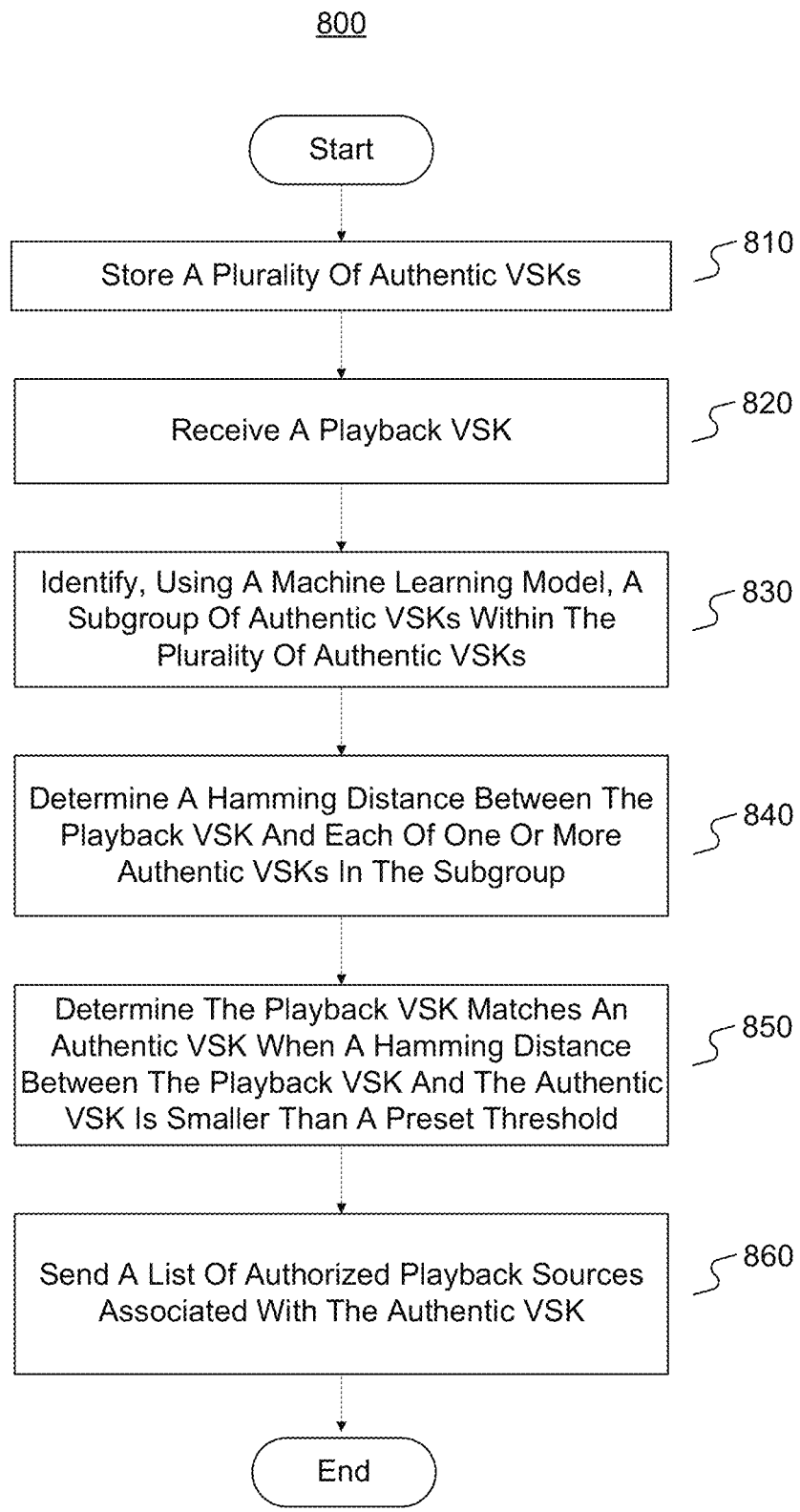
FIG. 8 is an exemplary process of detecting and preventing unauthorized playback of video content, consistent with some embodiments of the present disclosure.

FIG. 8 is an exemplary process 800 for detecting and preventing unauthorized playback of video content, consistent with some embodiments of the present disclosure. Process 800 can be performed by, for example, comparator 130 as described above with reference to FIG. 1A. As shown in FIG. 8, process 800 includes steps 810-860.

In step 810, comparator 130 stores a plurality of authentic VSKs. The plurality of authentic VSKs can correspond to various premium video content. For example, comparator 130 may be associated with an OTT provider and configured to perform piracy detection for various premium video content the OTT provider offers. The plurality of authentic VSKs can be received from the premium video content owner or generated by comparator 130 based on the premium video content. In some embodiments, authentic VSKs can be generated based on procedures similar to those used to generate playback VSKs, such as those described above with reference to FIGS. 5-6. Comparator 130 may store the plurality of authentic VSKs in an associated internal or external database, such as database 150.

In some embodiments, the authentic VSKs may be generated based on a set of video frames that are different from video frames included in promotional content associated with the premium video content, introductory frames of the premium video content (such as frames with list of cast members), or generic frames lacking distinct features. For example, before the official release of a new movie, some short clips of the movie may be included in a movie trailer designed for promotion. The trailer may include video frames that can be accessed and displayed on various user devices. When a user performs playback of the trailer on a display device, piracy detection and disruption for such playback may not be necessary. Accordingly, in some embodiments, authentic VSKs corresponding to the movie can be generated base on video frames not included in the trailer, so that playback VSKs corresponding to such frames are excluded from the VSK comparison process. In addition, frames having full-screen solid colors, such as full-screen black/white image frames, or other frames that lack differentiating features may be skipped or discarded. Such generic frames may be included in various premium video content and therefore provide little value in differentiating a particular piece of video content from others.

Further, in some embodiments, authentic VSKs corresponding to some premium video content may have an associated term of validity. For example, authentic VSKs corresponding to a new movie may be valid for the first six months after it is released. That first six months may be a period when piracy behavior poses the greatest threat. The term of validity can vary depending on the specific premium content at issue. In some embodiments, the term of validity of the authentic VSK can be associated with a term of piracy detection service. For example, in cases where comparator 130 is associated with a piracy detection agency managing various premium content for different content providers, different content providers may have contracted for piracy detection service for different time periods.

In step 820, comparator 130 receives a playback VSK from a display device, such as display device 120. The playback VSK can be generated based on a video playback currently performed by the display device.

In step 830, comparator 130 identifies, using a machine learning model, a subgroup of authentic VSKs within the plurality of authentic VSKs. The subgroup of authentic VSKs can correspond to premium video content that belong to the same category as the content of the video playback, and therefore include a potential matching authentic VSK. Step 830 includes processing similar to that described above with reference to FIG. 3, which is not repeated herein.

In step 840, comparator 130 determines a hamming distance between the received playback VSK and each of one or more authentic VSKs included in the subgroup. Hamming distance can represent the difference between two VSKs. The smaller the hamming distance, the higher similarity between two VSKs. For example, in some embodiments, image signatures can be used to represent the VSKs and can be in the form of binary data strings. The hamming distance between such VSKs can indicate the number of bit positions in which the two bits are different, which indicates a count of pixels that are different between two frames.

In step 850, when a hamming distance between the playback VSK and an authentic VSK is smaller than a preset threshold, comparator 130 can determine that the playback VSK matches that authentic VSK. The preset threshold can be adjusted depending on specific implementations. In some embodiments, if multiple authentic VSKs are identified to have a hamming distance from the playback VSK smaller than the preset threshold, the authentic VSK corresponding to the smallest hamming distance can be determined as the matching authentic VSK. In some embodiments, if no matching authentic VSK is found, process 800 may return to step 820 to receive one or more additional playback VSKs for comparison with the authentic VSKs to identify a matching authentic VSK. Further, if after receiving and comparing a preset number of VSKs, no matching authentic VSK is found, process 800 may terminate. A message can be generated by comparator 130, indicating that no matching authentic VSK is found. That message can further be sent to display device 120.

In step 860, comparator 130 sends a list of authorized playback sources associated with the matching authentic VSK to display device 120. If the playback VSK matches an authentic VSK, it means that the playback corresponds to the premium video content associated with that authentic VSK. Comparator 130 can then obtain a list of authorized playback sources that are allowed to offer or host that premium video content. The list can be used to determine whether the video source from which the playback content is obtained (such as video source 110) is one the authorized playback sources. In some embodiments, once a matching authentic VSK is identified, the list of authorized playback sources can be sent to display device 120 immediately or with a minimal latency, so that action can be taken in near real time to disrupt the playback if it is determined that video source 110 is an unauthorized source.

In some embodiments, after determining that a playback VSK based on one decoded frame matches an authentic VSK, one or more playback VSKs may be received. Comparator 130 can determine whether multiple playback VSKs corresponding to different decoded playback frames from the same video playback match authentic VSKs corresponding to the same premium video content. If the multiple playback VSKs match authentic VSKs corresponding to the same premium video content, comparator 130 can then determine, with high confidence, that the video playback corresponds to that premium video content. As an example, a first playback VSK may be received from display device 120. The first playback VSK can be generated based on a first decoded frame. Comparator 130 may determine that the first playback VSK matches an authentic VSK associated with Game of Crown. A second playback VSK may be received from display device 120, the second playback VSK being generated based on a different decoded frame from the same video playback currently performed by display device 120. Comparator 130 may then determine whether the second playback VSK corresponds to another authentic VSK. If the second playback VSK matches another authentic VSK of Game of Crown, it indicates that at least two decoded frames match two frames of Game of Crown. Comparator 130 can therefore determine, with a higher confidence, that the video playback is a version of Game of Crown. By comparing and matching multiple playback VSKs, mismatch caused by similar or generic frames can be avoided.

In some embodiments, a matching threshold can be set, to indicate the number of VSKs that have to be matched against authentic VSKs of the same piece of video content before comparator 130 confirms a match and sends a list of authorized playback sources to display device 120. Continuing with the above example, if the first playback VSK matches an authentic VSK of Game of Crown, and the second VSK matches an authentic VSK for a different piece of premium video content, display device 120 can send additional playback VSKs for further comparison by comparator 130 to ensure an accurate match.

In some embodiments, rather than sending the list of authorized playback sources to display device 120, comparator 130 may obtain information identifying video source 110 from display device 120. When a matching authentic VSK is identified, comparator 130 can determine whether video source 110 is included in the list of authorized playback sources and send a corresponding notification to display device 120. In some embodiments, the notification may further include an instruction to disrupt the video playback.

In some embodiments, solutions provided herein can assist video service providers or distributors in ensuring vendor or device compliance with their video security policy. According to some embodiments, display devices can implement generation or transmission of playback VSKs using a trusted processor or other hardware components with pre-installed logic associated with a Trusted Execution Environment (TEE), system-on-chip (SOC) components, or through software codes associated with video content security or anti-piracy solutions (such as security patches). Video service providers may desire to ensure that display devices include these hardware or software components for implementing the anti-piracy solutions, so that playbacks performed on the display devices can be checked. Taking an OTT provider as an example, the OTT provider may offer video services through an application that a user can install on their devices. The video service application can be configured to identify if a corresponding display device conforms to the hardware or software requirements.

As an example, the video service application can check if a hardware component (such as a chipset or processor) with pre-installed logic is present on the display device. If it is determined that such hardware component is not present on the display device, the video service application may send a corresponding notification to a management server associated with the OTT provider, such as comparator 130 or an associated server. The management server can then send an instruction through the video service application, instructing disruption or cessation of video service offered through the video service application. For example, if the video service application determines that the hardware component for implementing the anti-piracy solutions such as those disclosed herein is not present on the device, the management server of the OTT provider can send an instruction to the display device to block playback of any legitimate premium video content.

Similarly, the OTT provider can alternatively implement anti-piracy solutions through security patches. For example, the OTT provider may release a software update including software code for implementing methods disclosed herein for detecting and preventing unauthorized playback. The video service application can check if the software update is installed. If it is determined that the software update is not installed, normal video service provided through the video service application can be suspended until the installation is complete. That way, the OTT service provider can ensure that any user device using the video service application complies with security requirements.

With the solutions provided herein, unauthorized playback can be detected and prevented in near real time, and piracy can be effectively curbed. As an example, with some solutions disclosed herein, a user display device (using a process or through an application) can capture a decoded frame during a video playback and generate a unique identifier of the decoded frame (such as a VSK as described above). The generated identifier can be encrypted and sent to the backend, such as a comparator in the cloud, for analysis. The comparator can compare the received playback identifier with identifiers corresponding to original, premium video content. If the comparator determines that the playback identifier matches an identifier of a piece of premium video content, the comparator can notify the display device along with a list of authorized playback sources that are licensed to play or host that premium video content. The display device can check if the video source of the playback is included in the received list. If that video source is not included in the received list, the display device can disrupt the video playback. Alternatively, the playback can be disrupted after the identifiers of a few playback frames are matched to the same premium video content. According, if the playback is played from a pirated site (and hence not included in the list of authorized playback sources), the playback can be stopped in real time or after only a very limited number of frames are watched.

Solutions disclosed herein have the following additional advantages. The solutions can help prevent piracy and illegal consumption of premium video content before their official release, so long as the authentic identifiers are generated and can be accessed by the comparator. Further, using a unique identifier generated based on the frame content can avoid obfuscation or removal, which may be used to avoid logo or watermarking detection. Further, because the frame portion used for generating the identifiers is smaller than the actual frame, playback of video content that is recorded using an unsteady handheld camcorder can also be detected. In addition, piracy detection can be performed on a display device even if the OTT providers' legitimate video service applications are not installed on the device. Moreover, the present disclosure further provides solutions that OTT providers can use for ensuring that chipset or SOC vendors comply with the providers' security policy. For example, a display device may have installed the video service application provided by an OTT provider. The video service application can check if hardware components (such as a TEE processor or chipset) or software codes for implementing anti-piracy solutions are present on the display device. If such hardware components or software codes are not present on the display device, the video service application may stop performing normal video service.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Relational terms used herein, such as "first" and "second," are only used to differentiate one entity or operation from another entity or operation. Such terms do not necessarily require or indicate any mandatory sequence, order, or relationship between the described entities or operations. Moreover, terms such as "including," "comprising" or any other variations thereof may encompass nonexclusive inclusion. Since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for video content security, comprising:
acquiring, by a device performing a video playback, a set of video frames from a decoder during the video playback;
generating, based on the set of video frames, a first video identifier, wherein the generating further comprises:
selecting a first frame from the set of video frames;
identifying a frame portion of the first frame excluding a border region, the frame portion having an aspect ratio consistent with an aspect ratio of the first frame; and
generating an image signature based on features of the identified frame portion;
sending the first video identifier to a server;
in response to the server determining that the first video identifier matches a second video identifier, receiving, from the server, a list of authorized playback sources associated with the second video identifier, wherein the second video identifier is stored in the server;
determining whether a source of the video playback is included in the list of authorized playback sources; and
controlling the video playback based on the determination.

2. The method according to claim 1, wherein the generating the image signature comprises: converting the identified frame portion to grayscale; scaling the identified frame portion to a matrix of 88 or 16*9; and assigning bits in the matrix using a hashing logic based on a change of non-dimensional pixel gradients.

3. The method according to claim 2, wherein the scaling comprises: in response to the aspect ratio of the first frame being 4:3, scaling the identified frame portion to a matrix of 8×8; or in response to the aspect ratio of the first frame being 16:9, scaling the identified frame portion to a matrix of 16×9.

4. The method according to claim 2, wherein the bits are assigned vertically first in the matrix.

5. The method according to claim 1, further comprising: generating the first video identifier based on the image signature and at least one of: a logo in the first frame, or a watermark in the first frame.

6. The method according to claim 1, further comprising: determining a computation time associated with generating the first video identifier based on the first frame; in response to the computation time exceeding a preset threshold, selecting a second frame from the set of video frames; and generating the first video identifier based on the second frame.

7. The method according to claim 1, wherein the server determines that the first video identifier matches the second video identifier when a hamming distance between the first video identifier and the second video identifier is smaller than a preset threshold, the second video identifier being associated with a piece of premium video content.

8. The method according to claim 1, wherein the sending comprises:
encrypting the first video identifier; and
sending the encrypted first video identifier to the server.

9. The method according to claim 1, wherein after the sending the first video identifier to the server, the method further comprising:
receiving, from the server, a notification indicating receipt of the first video identifier.

10. The method according to claim 1, wherein the controlling comprises:
in response to the source of the video playback being not included in the list of authorized playback sources, disrupting the video playback.

11. The method according to claim 1, wherein the generating is performed by at least one of: pre-installed logic in the device, or software code associated with patch management.

12. The method according to claim 11, further comprising:
determining, through a video service application installed on the device, whether the pre-installed logic or the software code is present on the device; and
in response to a determination that the pre-installed logic or the software code is not present on the device, disrupting a service associated with the video service application.

13. The method according to claim 12, wherein the video service application is associated with a premium content management server, the method further comprising:
sending, to the premium content management server, a notification indicating the determination that the pre-installed logic or the software code is not present on the device; and
receiving, from the premium content management server, a response indicating disruption of the service associated with the video service application.

14. The method according to claim 1, wherein the generating is performed in a secure execution environment by a processor of the device.

15. A method for video content security, comprising:
storing a plurality of second video identifiers associated with a plurality of premium video content;
receiving a first video identifier associated with a video playback being performed on a device, wherein the receiving comprises:
selecting a first frame from a set of video frames;
identifying a frame portion of the first frame excluding a border region, the frame portion having an aspect ratio consistent with an aspect ratio of the first frame; and
generating an image signature generated based on features of the identified frame portion;
determining whether the first video identifier matches one of the plurality of second video identifiers; and
in response to the first video identifier matching one of the plurality of second video identifiers, sending, to the device, a list of authorized playback sources associated with the one of the plurality of second video identifiers.

16. The method according to claim 15, wherein the determining comprises:
identifying, using a machine learning model, a subgroup of second video identifiers within the plurality of second video identifiers, based on features associated with the video playback;
determining a hamming distance between the first video identifier and each of one or more second video identifiers in the subgroup; and
in response to determining that one of the second video identifiers in the subgroup has a hamming distance from the first video identifier smaller than a preset threshold, determining that the first video identifier matches the one of the plurality of second video identifier.

17. The method according to claim 15, further comprising:
receiving a third video identifier associated with the video playback, the first video identifier and the third video identifier being generated based on different decoded frames of the video playback; and
determining whether the third video identifier matches another one of the plurality of second video identifiers;
wherein the list of authorized playback sources is sent in response to a determination that the third video identifier matches another one of the plurality of second video identifiers, the one of the plurality of second video identifier and the another one of the plurality of second video identifiers being associated with a same piece of premium video content.

18. The method according to claim 15, wherein the plurality of second video identifiers are generated based on a sample set of video frames from the plurality of pieces of premium video content, the sample set of video frames being different from video frames included in promotional content.

19. The method according to claim 15, wherein the one of the plurality of second video identifiers is valid for a preset term.

20. The method according to claim 15, wherein the first video identifier is received from at least one of: the device performing the video playback, or a server communicating with the device.

21. A system for video content security, comprising:
a memory storing instructions; and
a processor configured to execute the instructions to perform a method comprising:
acquiring, by a device performing a video playback, a set of video frames from a decoder during the video playback;
generating, based on the set of video frames, a first video identifier, wherein the generating further comprises:
selecting a first frame from the set of video frames;
identifying a frame portion of the first frame excluding a border region, the frame portion having an aspect ratio consistent with an aspect ratio of the first frame; and
generating an image signature based on features of the identified frame portion;
sending the first video identifier to a server;
in response to the server determining that the first video identifier matches a second video identifier, receiving, from the server, a list of authorized playback sources associated with the second video identifier, wherein the second video identifier is stored in the server;
determining whether a source of the video playback is included in the list of authorized playback sources; and
controlling the video playback based on the determination.

22. A system for video content security, comprising:
a memory storing instructions; and
a processor configured to execute the instructions to perform a method comprising:
storing a plurality of second video identifiers associated with a plurality of pieces of premium video content;
receiving a first video identifier associated with a video playback being performed on a device, wherein the receiving comprises:
selecting a first frame from a set of video frames;
identifying a frame portion of the first frame excluding a border region, the frame portion having an aspect ratio consistent with an aspect ratio of the first frame; and
generating an image signature generated based on features of the identified frame portion;
determining whether the first video identifier matches one of the plurality of second video identifiers; and
in response to the first video identifier matching one of the plurality of second video identifiers, sending, to the device, a list of authorized playback sources associated with the one of the plurality of second video identifiers.

* * * * *